United States Patent Office 3,004,576
Patented Oct. 17, 1961

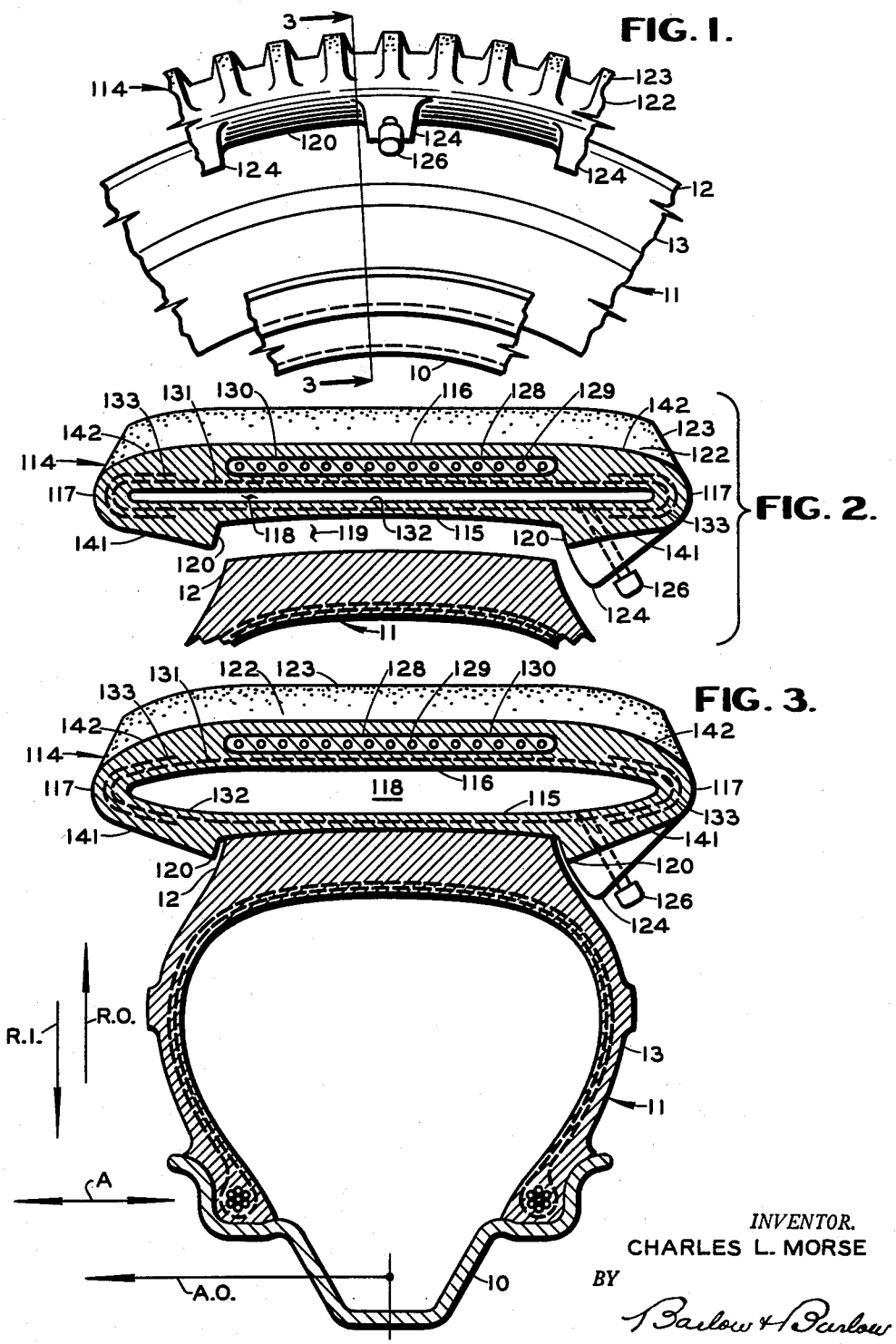

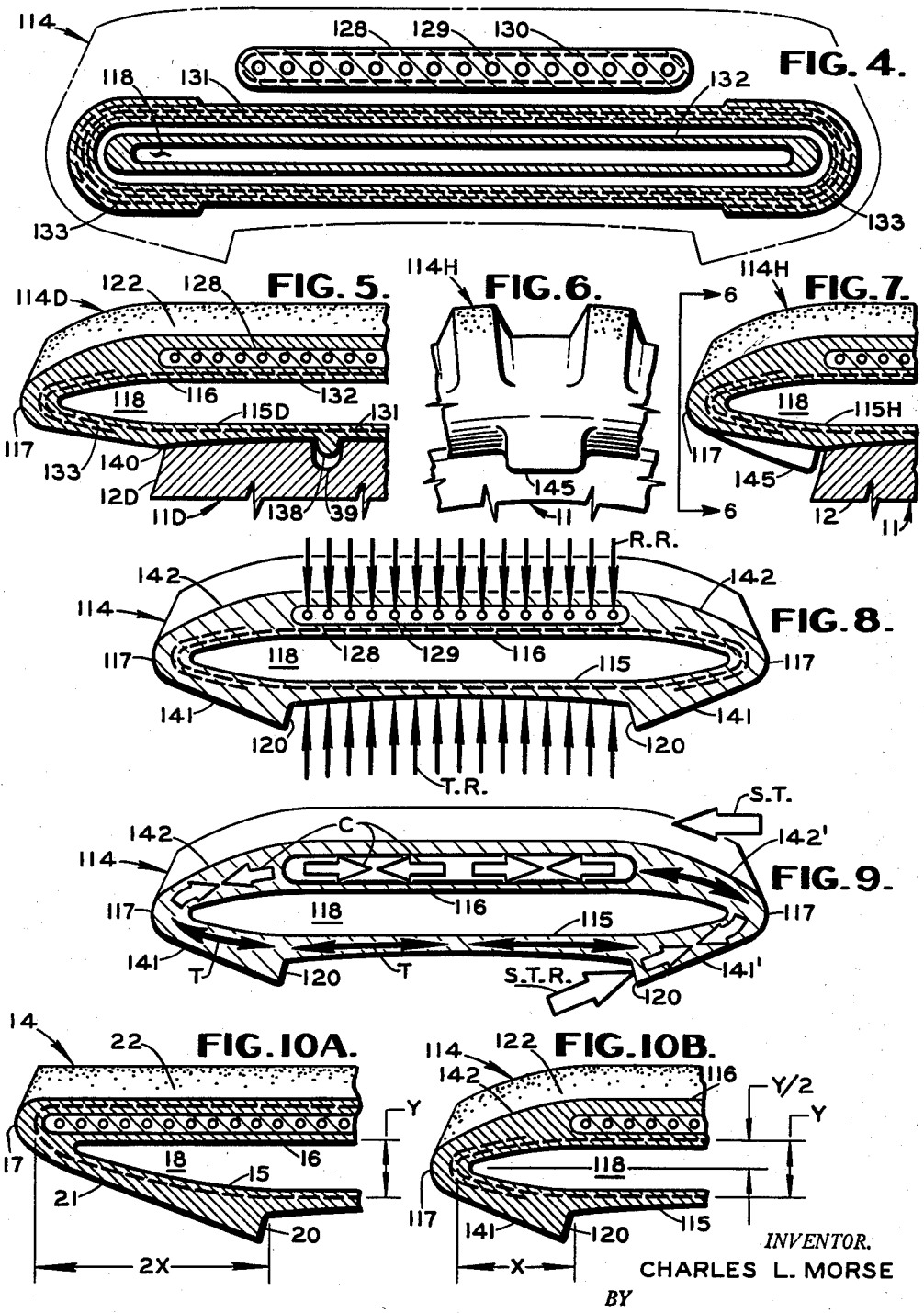

3,004,576
SUPPLEMENTAL PNEUMATIC TIRE
Charles L. Morse, P.O. Box 156, South Dartmouth, Mass.
Filed Oct. 14, 1959, Ser. No. 846,381
8 Claims. (Cl. 152—175)

This invention relates to improvements in vehicle tires, particularly to a supplemental tread which is to be mounted pneumatically onto a conventional automobile, truck, or airplane tire and is a continuation-in-part of my application Serial No. 593,078, filed June 22, 1956, now abandoned. The supplemental pneumatic tire of this invention provides a vehicle wheel with a larger bearing area, better traction, and greater ground clearance.

Although supplemental treads, tires, or so-called "shoes" of the above character heretofore have been proposed for difficult snow-and-mud traction, those supplemental tires with which I am familiar are either difficult or impossible to install and remove, expensive to manufacture or unable to satisfactorily meet side thrust loads. These prior shoes generally have an innermost diameter substantially less than the outermost diameter of the conventional tire, and to place the smaller diameter over the larger diameter is well beyond the ability of the average motorist. Therefore, these prior shoes offer no advantage over changing the usual tire to a snow tire or other specialized conventional tire.

An object of the invention is to provide for improvements in the prior supplemental tire of the above character.

A more specific object of the invention is to provide a supplemental tire of the above character so constructed that when in the deflated condition, sufficient clearance will be had to permit it to be readily slipped on the conventional vehicle tire without the use of tools.

Another object of the invention is to provide a supplemental tire of the above character so constructed that when positioned on a conventional vehicle tire and inflated, the radially-inner wall thereof will deform in cross section into the configuration of the portion of the conventional tire over which it is placed to be firmly held thereon.

Another object of the invention is to provide a supplemental tire of the above character constructed on the principle of a single stage contracted bellows, so that after deflation the radially-inner wall will automatically return to the retracted position for easy removal of the tread.

Another object of the invention is to provide a supplemental tire of the above character so constructed as to provide a high degree of resistance to side thrust.

Another object of the invention is to provide a supplemental tire of the above character without excessive diameter and still provide for sufficient tread mass for the purpose of use intended.

Another object of the invention is to provide a supplemental tire of the above character so constructed that it is of relatively narrow width to fit within the limits of existing vehicle wheel wells or mud guards.

Still another object of the invention is to provide a supplemental tire of the above character that is relatively easy and inexpensive to manufacture.

With these and other objects in view, the invention consists of certain novel features of construction as will be more fully described and particularly pointed out in the appended claims.

In the accompanying drawings:

FIGURE 1 is a side view of a fragmentary section of a supplemental tire or shoe embodying my invention and shown pneumatically mounted on a conventional vehicle tire;

FIGURE 2 is a sectional view similar to FIGURE 3, except without inflation;

FIGURE 3 is an enlarged sectional view taken substantially along line 3—3 of FIGURE 1;

FIGURE 4 is an expanded sectional view of the fabric and wire annulus of an uninflated supplemental pneumatic tire showing the construction thereof and the manner in which the fabric plies are wrapped around the inner lining;

FIGURE 5 is a fragmentary sectional view showing an alternate form of construction with a central ring-and-groove arrangement to prevent axial shift between the conventional tire and the supplemental tire;

FIGURE 6 is a fragmentary side view of FIGURE 7;

FIGURE 7 is a fragmentary sectional view showing an alternate form of construction whereby intermittent rather than continuous lip portions are used to prevent axial shift between the conventional tire and the supplemental tire;

FIGURE 8 is a diagrammatic representation illustrating how the force of the internal air pressure is balanced by the conventional tire and the circumferential wire annulus;

FIGURE 9 is a diagrammatic representation illustrating how side thrust, applied to the supplemental tire, is transmitted by tension and compression forces into the conventional tire;

FIGURES 10A and 10B show fragmentary cross sections respectively of a supplemental tire based on a wide, half-stage bellows design compared to a supplemental tire based on a narrow, whole-stage bellows design.

To prevent confusion when describing various features of the supplementary pneumatic tire, directional arrows are shown adjacent to FIGURE 3. Arrow A indicates axial direction; arrow A.O. indicates axially-outer direction; R.I. and R.O. indicate radially-inner and radially-outer directions respectively.

The supplemental pneumatic tire or shoe of the present invention may be generally described as an inflatable annulus having a higher tread mass and larger print area than the conventional vehicle tire and is adapted to be easily mounted on the existing tires of a vehicle so as to adapt its use to snow, ice, mud, sand, or wherever extreme traction and large bearing surfaces are needed. It is comparable to some extent to conventional tire chains but is more dependable in operation, gives greater road clearance, permits higher road speeds, and affords smoother riding on bare pavements.

Additionally, the supplemental pneumatic tire of the present invention may be used as a replacement for a spare tire. When the supplemental tire is constructed with suitably strong annulus reinforcement, a generally circular shape will be retained with the tire in place. Thus, when the supplemental tire is installed over a punctured or flat vehicle tire, the latter is squeezed evenly inward over its entire circumference and will retain a circular shape rather than flatten at point of contact with the road.

In the present invention, the mass of the shoe is distributed and arranged so as to provide when deflated an annulus having a sufficiently large inner diameter to be easily slipped over the vehicle tire on which it is to be mounted, and when inflated, the radially-inner wall will move into complemental relation with the vehicle tire, with the lips or abutments adjacent to, or engaging, the side walls of the vehicle tire. Thus, the supplemental shoe is pneumatically held firmly in position.

Referring to FIGURES 1 and 3, 10 designates generally a vehicle rim on which is mounted a conventional tire casing 11 having a usual tread mass indicated at 12 extending into the side walls 13. The casing 11 is to be considered as being in the inflated condition throughout the several figures of the drawings. The supplemental pneumatic tread 114 which is the subject of the present invention will be referred to as a shoe or "overtire" for the sake of clarity in distinguishing between it and the usual tire casing 11 on which it is mounted. The overtire is preferably a resilient casing, essentially flat in cross section, made by wrapping or winding a rubberized reinforcing fabric crosswise or spirally about a flattened rubber lining until the desired number of layers have been built up with additional spot reinforcement as desired. This structure with the annulus 128 and suitable cleats is then molded or vulcanized to approximately the cross-sectional shape shown in FIGURE 2. The ultimate molded result may be said to effectively form a flat, inflatable annulus that is mounted inside a semi-rigid reinforcing annulus. Upon inflation of the overtire, the reinforcing annulus 128 prevents radially outward expansion of the inflatable annulus but allows a radially inward movement that clamps the overtire 114 firmly against the conventional tire 11, as will now be explained in more detail.

Referring to FIGURE 2, the overtire is constructed in the form of an annular chamber, flat in cross section having spaced annular walls 115 and 116 which are integrally joined at their edges by side walls 117. Thus, there is formed a sealed annular cavity or chamber 118 which is adapted to receive and hold a gas, such as air, under pressure. The walls 115 and 116 are normally straight in the axial direction of the overtire. The wall 115 which is the radially-inner wall is smooth on the side facing chamber 118. On the opposite face of wall 115, there is a recess 119, formed by ridges or circumferential lips 120 at the edges of the recess, said ridges or lips extending radially inward. The space between the lips 120 is slightly larger than the tread portion 12 of vehicle tire 11. The portion 141 of wall 115 extending axially outward from lips 120 and the corresponding portion 142 of wall 116 serve as either tension or compression members to resist side thrust. This is shown schematically in FIGURE 9 and will be discussed more fully hereinafter. A tread mass 122 projects radially outwardly from the radially-outer wall 116 and is formed by a plurality of closely spaced cleats 123 (see FIGURE 1) which extend into the sides 117 in continuation thereof. A lug or abutment 124 (see FIGURES 1, 2, and 3) located between one side wall 117 and lip 120 and projecting radially inwardly from wall 115 helps align the overtire when it is being installed. Additionally, abutment 124 prevents misalignment or overtire cross-over during a flat tire or other sudden loss of air. In FIGURES 1, 2, and 3, an air valve mechanism 126, mounted on abutment 124 and projecting through wall 115, provides a means to inject air under pressure into chamber 118.

The radially-outer wall 116 is strengthened by a reinforcing annulus 128 with circumferential steel wires 129. The primary purpose of the annulus 128 is to provide a strong radial restraint for the overtire in order to maintain the diameter of the overtire and to prevent crowning under air pressure within chamber 118 and without unduly thickening wall 116. When the average overtire is inflated, the total pressure on wall 116 runs into many thousands of pounds. Additionally, when the overtire is in operation, centrifugal force, heat, etc., further tend to radially expand wall 116. Thus the need for a strong reinforcing annulus 128 is apparent and additional purposes of the annulus 128 will hereinafter be described. In an axial direction, the wires 129 are integrated by a rubberized cross fabric 130, of any suitable material, as shown in the expanded drawing of FIGURE 4. Preferably walls 115, 116, and 117 are made in continuity of construction by a continuous, spirally-wound rubberized fabric 131 about the rubber lining 132. Rubberized fabric 133 reinforces the side portions 117. For clarity of drawing, fabrics 130, 131, and 133 are shown as only a single dash line in most views. However it is to be understood that several plies of rubberized fabric are intended, and additional reinforcing fabric may be added at critical stress or wear points as needed.

When the overtire 114 is to be mounted on the usual vehicle tire, the wheel, without deflating the tire 11, is raised from the ground in the usual manner as when changing a tire. As the innermost diameter of the annular lip 120 of the overtire 114 is made slightly larger than the periphery of the casing 11 on which the overtire is to be mounted, the overtire 114 is readily slipped on the casing 11, as shown in FIGURE 2. Air under pressure may now be introduced through valve mechanism 126 into chamber 118. It will be seen in FIGURES 2 and 3 that the air pressure when applied is almost entirely against walls 115 and 116, and insignificantly against side walls 117. Therefore, walls 115 and 116 have a tendency to move apart. FIGURE 8 diagrammatically represents the restraining forces on these two walls. The arrows R.R. indicate the radial restraint of the circumferential reinforcing wires 129 on wall 116. Wall 115 is free to move radially inward until it is restrained by the conventional tire 11. This tire restraint is indicated in FIGURE 8 by the arrows T.R. The side portions 141 and 142 form a single-stage (double wall) bellows or annular pleat in the open position. As shown in FIGURES 1 and 3, the overtire 114 when inflated to normal pressure will engage the entire circumference of an average size automobile tire with a force well in excess of 10,000 lbs. Thus there will be no rotational slippage between tire 11 and overtire 114. Releasing the air through valve mechanism 126 permits wall 115 to move radially outwardly so that the overtire is easily and quickly removed when the wheel has been jacked up.

The construction and operation of a typical overtire has been described. Various features, alternate designs, and construction details will now be analyzed:

The overtire of the present invention lends itself well to low cost production. FIGURE 4 shows in expanded form the principal structural components of the overtire 114. All surfaces may be considered bonded together into one integral unit, except for chamber 118.

A prime requirement for a successful overtire is the ability to meet axial load or side thrust. The semi-rigid annulus 128 is essential for this function, which will now be more fully described: The annulus 128 is substantially a straight line in cross section, and it is a section of a cylinder when taken as an entity by itself. Therefore, when a transverse or axial load is applied to annulus 128, as at the point of contact with the road surface, the annulus 128 acts as a monocoque or stress-skin structure and distributes the load over a wide area. As a result, the overtire 114 cannot be dislodged locally from tire 11 but may only be removed simultaneously over a large portion of casing 11. Since the lip 120 grips the casing over the entire circumference thereof, it would be virtually impossible to tear the overtire 114 loose from said casing 11 by a transverse load applied on tire 114 during the skidding action of the vehicle.

FIGURE 9 is a diagrammatic representation illustrating how side thrust, shown by the arrow S.T., is transmitted by tension and compression forces through the overtire 114 and how the side thrust is resisted by the conventional tire 11 at a point designated by the arrow S.T.R. denoting side thrust reaction. Arrows C denote compression forces and arrows T denote tension forces. In addition to the side thrust transmitted through lips 120, considerable side thrust is also transmitted by friction between the middle portion of wall 115 into the tread 12 of tire 11.

FIGURE 5 shows a modified overtire 114D whereby the usual circumferential lips 120 have been dispensed with in favor of a centrally-spaced annular ridge 138 on the radially-inner face of wall 115D, said ridge 38 fitting into a mating groove 39 in the tread 12D of tire 11D. Wall 115D is thickened at 140 so that the wall conforms to the contour of tread 12D and also so that wall 115D is reinforced at a critical flexing point.

FIGURES 6 and 7 show another modified overtire 114H whereby the usual circumferential lips 120 of overtire 114 are replaced by intermittently spaced lip segments or abutments 145 attached to the radially-inner surface of wall 115H. Although only one abutment 145 is shown, it should be understood that any number and size of abutments may be used, generally the smaller abutments are provided on one side to provide easy overtire installation and the larger abutments are provided on the other side to facilitate installation alignment and prevent overtire cross-over.

FIGURES 10A and 10B show fragmentary cross sections respectively of a supplemental tire based on a wide, half-stage bellows design compared to a supplemental tire based on a relatively narrow, whole-stage bellows design. Overtire 14 shown in FIG. 10A is described in my patent application No. 846,394 filed on even date herewith and overtire 114 shown in FIG. 10B is the subject of the present invention. Overtire 14 consists of a radially-outer wall 16 joined to a radially-inner wall 15 at side portions 17 to form annular chamber 18. Wall 15 has lip portions 20 and axially-outer wall portions 21 between lips 20 and side portions 17. Other structural elements of overtire 14 have not been designated as this numbering would be superfluous to the present comparison.

The purpose of the present comparison is to show that the whole-stage bellows section of the overtire 114 is substantially narrower than the half-stage bellows section of overtire 14. In overtire 14 the wall 16 is relatively rigid and therefore all radial flexing Y must be done by portion 21 of wall 15. In overtire 114 the radial flexing Y is done by both walls 115 and 116, or Y/2 per wall. Therefore it is apparent from FIGURE 10A that the length 2X of wall portion 21 is twice the length X of wall portions 141 and 142 in FIGURE 10B. Thus for a given radial flexing, the overtire 114 is substantially narrower than overtire 14 and therefore is better adapted for use on vehicles with limiting mud guards or wheel wells.

The relatively narrow overtire 114 and several variations have been representatively described herein. In summary, there has been described an improved overtire which may be manufactured easily and at low cost and which exhibits extreme ease of installation and removal together with a great ability to resist side thrust.

I claim:

1. In combination with an inflatable hoop-shaped member, a supplemental overtire adapted to be pneumatically mounted on said hoop-shaped member comprising an annular resilient casing having an annular chamber therein, said casing comprising a fabric reinforced rubber lining, said casing in cross section having a substantially straight radially-outer wall and a substantially straight radially-inner wall, said walls joined at their axially-outer extremities by fabric-reinforced axially-outer side portions, said wall portions integrally formed of continuous reinforced rubberized fabric, said radially-outer wall having circumferentially extending reinforcements spaced partially across the width thereof and traction means on the radially-outer surface thereof, said circumferentially extending reinforcements being centrally located and being of a substantially narrower width axially than said radially-outer wall, the axially outer portions of said radially-outer wall being more resilient than said wire reinforced center portion, said radially-inner wall being resilient throughout its width, a central portion of said radially-inner wall being adapted to engage the periphery of said hoop-shaped member upon overtire inflation, means for axially engaging the said member to prevent axial shift between said overtire and said member when said overtire is inflated, said radially-inner wall when said overtire is uninflated having a diameter slightly larger than the diameter of said member, whereby said overtire may be slipped on to said member without deflating the latter, and means for introducing air under pressure into said chamber to inflate said overtire, said air pressure forcing radially inwardly the said radially-inner wall to firmly engage the periphery of said member, and said radially-inner wall retracting radially outwardly upon the release of said air pressure to permit easy removal of said overtire.

2. The structure according to claim 1 wherein the means for axially engaging said member comprises circumferentially extending ridge portions disposed at either edge of said central portion of said radially-inner wall, said ridge portions having a face thereof which is adapted to engage the radially-outer circumferential marginal side edges of said member.

3. The structure according to claim 1 wherein the means for axially engaging said member comprise a circumferential annular ridge located on the radially-inner wall of said casing and projecting radially inwardly therefrom to engage a complemental recess provided in said member.

4. The structure according to claim 1 wherein one axially-outer portion of said radially-inner wall of said casing is provided with a series of circumferentially-spaced abutments, said abutments extending radially inwardly so as to engage the peripheral side portions of said member and facilitate installation of the casing thereon, said abutments also preventing said overtire crossover during sudden loss of air pressure.

5. A supplemental overtire adapted to be pneumatically mounted on a vehicle tire comprising an annular resilient casing having an annular chamber therein, said casing in cross section comprising a flattened tubular rubber lining, said lining extending in a substantially straight, axial direction, said lining extending substantially beyond the tread portion of said vehicle tire, said lining being encircled crosswise and about with rubberized reinforcing fabric to form an integral inflatable annulus, the axial outer portions of said inflatable annulus forming a closed, annular pleat when said overtire is in the uninflated condition, a semi-rigid annulus circumferentially encircling said inflatable annulus to prevent its radial expansion, said semi-rigid annulus comprising rubberized fabric and circumferential wire reinforcements, and said semi-rigid annulus being substantially narrower axially than said inflatable annulus, said annular resilient casing having a radially-inner wall and said annular resilient csing together with said semi-rigid annulus having a radially-outer wall, said casing having a tread mass on the radially-outer wall and a surface on said radially-inner wall adapted to meet the periphery of said vehicle tire, said radially-inner wall having means for axially engaging the said vehicle tire to prevent axial shift between said overtire and said vehicle tire when said overtire is inflated, said radially-inner wall when said overtire is uninflated having a diameter slightly larger than the diameter of said vehicle tire, whereby said overtire may be slipped on to said vehicle tire without deflating the same, and means for introducing air under pressure into said chamber to inflate said overtire, said air pressure forcing radially inwardly said radially-inner wall to firmly engage the periphery of said vehicle tire, the side portions of said inflatable annulus forming an open, annular pleat, said pleat capable of transmitting axial load from the radially-outer wall to the radially-inner wall.

6. A supplemental overtire according to claim 5 wherein the means for axially engaging said vehicle tire comprises circumferentially extending ridge portions disposed at either edge of said central portion of said radially-inner wall, said ridge portions having a face thereof which is adapted to engage the radially-outer circumferential marginal side edges of said vehicle tire.

7. A supplemental overtire according to claim 5 wherein the means for axially engaging said vehicle tire comprise a circumferential annular ridge located on the radially-inner wall of said casing and projecting radially inwardly therefrom to engage a complemental recess provided in said vehicle tire.

8. A supplemental overtire according to claim 5 wherein one axially-outer portion of said radially-inner wall of said casing is provided with a series of circumferentially-spaced abutments, said abutments extending radially inwardly so as to engage the peripheral side portions of said vehicle tire and facilitate installation of the casing thereon, said abutments also preventing said overtire crossover during sudden loss of air pressure.

References Cited in the file of this patent

UNITED STATES PATENTS

| | | |
|---|---|---|
| 1,989,402 | Cupp | Jan. 29, 1935 |
| 2,365,279 | Kraft | Dec. 19, 1944 |
| 2,735,471 | McLean | Feb. 21, 1956 |
| 2,874,742 | Lugli | Feb. 24, 1959 |
| 2,950,751 | Bolster et al. | Aug. 30, 1960 |